June 10, 1941.  B. S. AIKMAN  2,245,424
BRAKE CONTROL MEANS
Filed Jan. 12, 1940  4 Sheets-Sheet 1

Fig.1.

INVENTOR
BURTON S. AIKMAN
BY
ATTORNEY

Fig. 2.

Patented June 10, 1941

2,245,424

UNITED STATES PATENT OFFICE 2,245,424

BRAKE CONTROL MEANS

Burton S. Aikman, Wilkinsburg, Pa., assignor to The Westinghouse Air Brake Company, Wilmerding, Pa., a corporation of Pennsylvania Application January 12, 1940, Serial No. 313,513

9 Claims. (Cl. 303—21)

This invention relates to fluid pressure brake controlling means, and more particularly to means for controlling the application of the brakes in a manner to inhibit or wholly prevent sliding of vehicle wheels during application of the brakes.

It is well known that sliding of vehicle wheels due to application of the brakes thereon is objectionable, both because of damage done to the wheels and because of the reduced retarding effect which is produced by a sliding wheel. As a consequence, it is desirable that means be provided which will detect an incipient stage of wheel sliding and then operate immediately to correct the condition and permit the wheel to assume normal rotation. The incipient stage of wheel sliding is generally referred to as a slipping condition of the wheel, that is to say, a wheel is said to slip when it rotates at a speed below that of non-slipping wheels, and is said to slide when not rotating at all and held in a locked state.

An object of my invention is to provide an improved fluid pressure controlled apparatus which is responsive to a slipping condition of a vehicle wheel and thereby rendered automatically operative to govern operation of the brakes on the slipping wheel so as to correct the cause of the slipping condition.

Another object of the invention is to provide fluid pressure controlled means having a mechanism operatively responsive to an abnormal or sudden reduction in the rotative speed of a vehicle wheel, resulting in initial slipping thereof during application of the brakes, to effect quick release of the braking force, thereby preventing sliding of the wheels.

Other objects and advantages of the invention will appear in the following more detailed description thereof, taken in conjunction with the accompanying drawings, in which.

Figure 1:
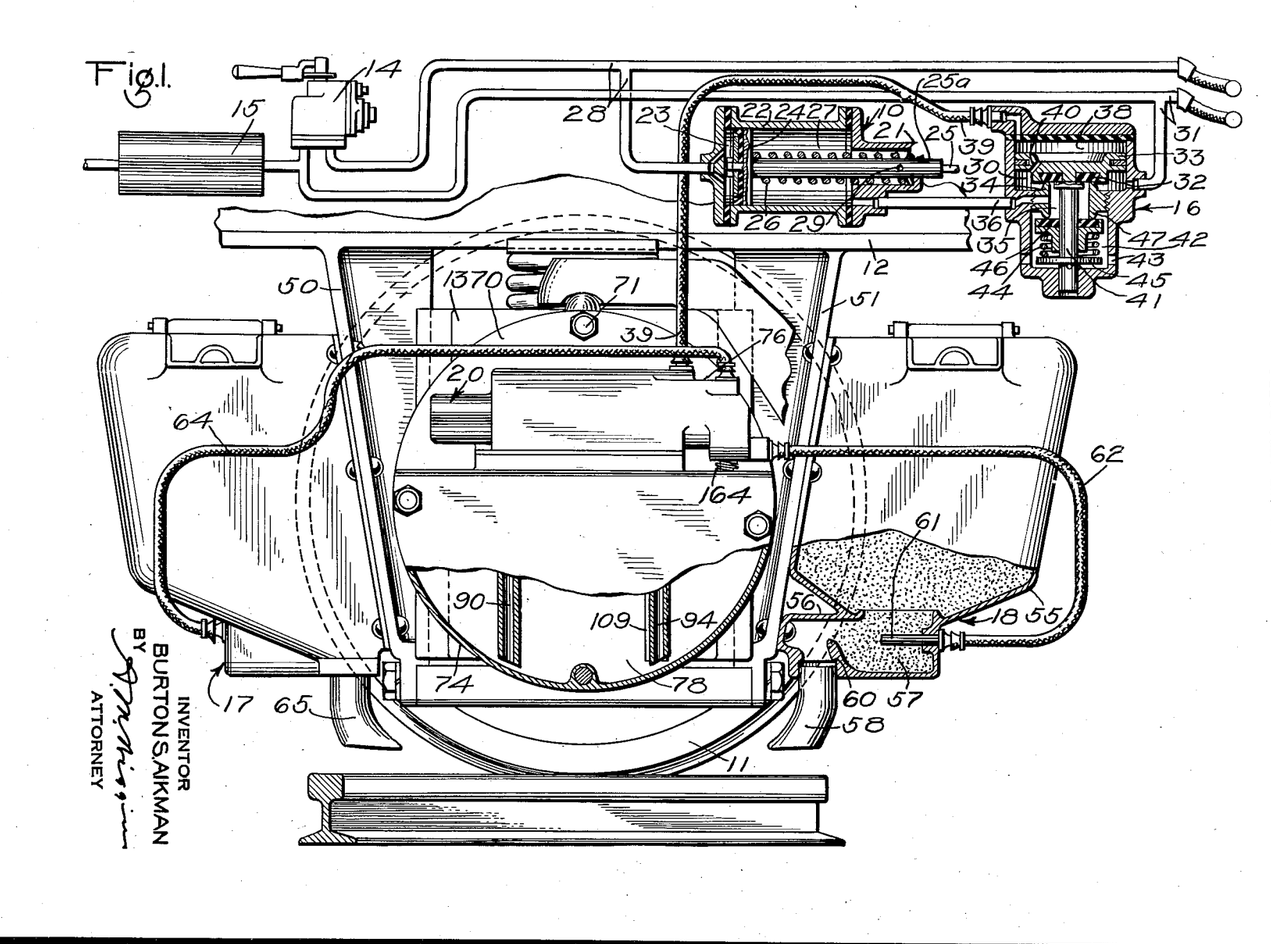
Fig. 1 is a diagrammatic elevational view, mainly in section, of a fluid pressure brake equipment embodying features of the invention.
Figure 2:
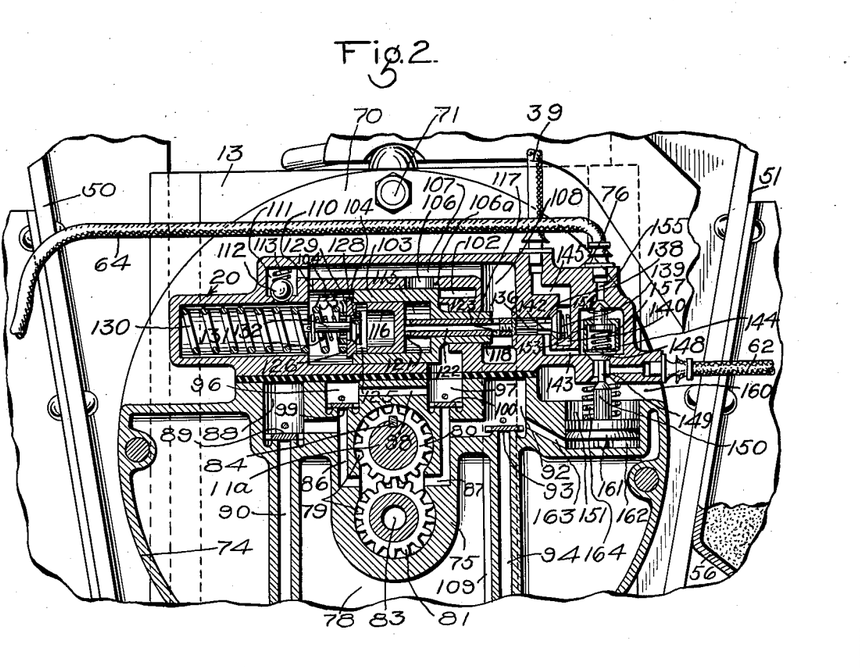
Fig. 2 is an enlarged detail sectional view of a portion of the control mechanism shown in Fig. 1.

*Apparatus shown in Fig. 1*

According to the invention as embodied in the equipment shown in Fig. 1 of the drawings, there is provided a brake cylinder device 10 which is suitably connected through the medium of rigging means, not shown, to the usual brake mechanism associated with a wheel and axle assembly 11 of a railway truck. The truck is illustrated in fragmentary form and includes a truck frame 12 adapted to be supported on a journal box 13. The braking equipment further comprises a self-lapping brake valve device 14, a reservoir 15, a brake release valve device 16, a pair of sanding devices 17 and 18, and a deceleration control valve mechanism indicated generally by the character 20.

The brake cylinder device 10 comprises a casing 22 within which is slidably mounted a piston 24 dividing the casing into chambers 23 and 27. The piston is operatively connected by means of a piston rod 25 to the usual brake rigging, not shown. The piston rod is contained within a sleeve element 25a, which is slidably fitted in an aperture in the end 21 of the casing, and has formed therein a relief port 29. A release spring 26 is mounted within the chamber 27 for moving the piston 24 toward release position when fluid under pressure is released from the chamber 23, or when fluid under pressure is supplied to the chamber 27, as hereinafter explained. The piston chamber 23 is adapted to be supplied with fluid under pressure through the medium of a pipe 28, which is connected with the supply port of the self-lapping brake valve device 14 and may extend throughout the train.

The brake release valve device 16 is adapted to respond to operation of the deceleration control valve device 20, as hereinafter explained, to control the supply of fluid under pressure to the chamber 27 of the brake cylinder device 10 for the purpose of preventing sliding of the wheels. This valve device comprises a casing having a valve chamber 30 communicating with a fluid pressure supply pipe 31, within which chamber is mounted a valve 32 that is carried by a piston 33 and is adapted to engage a valve seat rib 34 formed in the casing. The valve 32 controls communication from the valve chamber 30 to a bore 35, which communicates by way of a pipe 36 with the chamber 27 of the brake cylinder device 10. The piston 33 is subject to the opposing pressures of fluid in the valve chamber 30 and in a chamber 38, which communicates with a conduit 39 leading to a communication in the deceleration control valve device 20 hereinafter described. A restricted passage 40 formed in the piston 33 provides communication between the chambers 38 and 30.

The valve 32 has a stem 41 which extends through the bore 35 and into a spring chamber 42 communicating through a port 43 with the atmosphere, which stem is normally urged downwardly to hold the valve 32 in seated position under the pressure of a spring 44 that is interposed between a collar 45 carried by the stem and a valve element 46 slidably mounted thereon. The valve element 46 is in turn urged into seated engagement with a seat rib 47 formed on the casing, under the force exerted by the spring 44, for closing communication between the bore 35 and the atmospheric chamber 42.

The sanding devices 17 and 18 are similarly constructed, and are secured by bolts or other suitable means on downwardly extending strut members 50 and 51, which form portions of the vehicle frame 12 and are disposed on opposite sides of the usual journal box 13 associated with the wheel and axle assembly 11. The sanding device 18 is illustrated partly in section, and comprises a sand hopper 55 having formed on the lower side thereof a portion 56, in which is formed a sand chamber 57 that communicates with a sand discharge pipe 58 adapted to direct flow of sand to the rail adjacent the wheel. Sand contained in the hopper 55 is adapted to flow under the force of gravity into the sand chamber 57, where it is normally retained by a baffle wall 60 formed on the casing within the chamber. A nozzle 61 communicating with a conduit 62 and mounted in the casing portion 56 within the sand chamber 57 is adapted to direct flow of fluid under pressure through the chamber for driving sand over the baffle wall 60 and through the sand pipe 58. The conduit 62 is adapted to be supplied with fluid under pressure in response to operation of the deceleration control valve device 20 as hereinafter explained.

It will be understood that the sanding device 17 has the same construction as that of the sanding device 18. The sanding mechanism 17 is adapted to be supplied with fluid under pressure by way of a conduit 64 for depositing sand on the rail through the medium of a sanding pipe 65.

The acceleration control valve device 20 comprises a casing structure including a main section 70 secured by suitable means, such as bolts 71, to the journal box 13, a reservoir portion 74, a pump portion 75, and a valve portion 76. Formed within the reservoir portion 74 of the casing structure is a liquid supply chamber 78 which is adapted to be filled with a suitable liquid, such as oil. The pump portion 75 of the casing structure is disposed partly within the chamber 78 and has formed therein a pair of connected circular chambers 79 within which are rotatably mounted two intermeshed pumping gears 80 and 81. The gear 81 is mounted on a pin or shaft 83 which is suitably journaled in the casing structure, and the other gear 80 may be secured to an extension 11a of the vehicle axle by means of a key 84. The pumping gears 80 and 81 are adapted to be operated to supply liquid from the supply chamber 78 to either of two oppositely disposed receiving passageways 86 and 87, depending upon the direction of rotation of the wheel and axle assembly 11, as hereinafter explained.

The passageway 86 communicates with an inlet valve chamber 88 which contains an inlet valve 89 for controlling communication to the valve chamber from a vertically disposed intake conduit 90 that extends to the lowermost portion of the supply chamber 78. Similarly, the passageway 87 communicates with an inlet valve chamber 92 containing an inlet valve 93 which controls communication between the valve chamber and an intake pipe 94 opening into the supply reservoir 78. Both of the passageways 86 and 87 also communicate with discharge valve chambers 96 and 97, respectively, which are connected together by way of a passage 98. Discharge valves 99 and 100 are disposed in the valve chambers 96 and 97 for preventing back flow of liquid to the respective passageways 86 and 87.

Formed in the valve section 76 of the casing structure and preferably extending longitudinally thereof is a bore 102, which communicates directly with the discharge valve chamber 97 and by way of passage 98 with the discharge valve chamber 96. Slidably mounted in the bore 102 is a piston 103 having formed at one side thereof a chamber 104. The piston 103 is adapted to vary the flow area of a port 106 connecting the bore 102 with a passageway 107, which communicates by way of a discharge chamber 108 and pipe 109 with the liquid supply reservoir 78. The port 106 has a restricted portion 106a through which liquid can flow at a restricted rate from the bore 102 to the passageway 107 when the piston 103 is disposed in the normal position thereof, as shown in Fig. 1 of the drawings. The passageway 107 also communicates with the chamber 104 through a restricted port 110, and also by way of a valve chamber 111 containing a release ball check valve 112. The ball check valve 112 is urged toward seated position under the force of a spring 113, so that liquid can flow from the passageway 107 to the chamber 104 only by way of the restricted port 110, while flow of liquid in the opposite direction may be affected both by way of the port 110 and past the check valve.

The piston 103 has a longitudinal bore 115 in which is slidably mounted a smaller piston 116 having secured thereto a hollow stem 117 that is slidably mounted in a bore formed in an extension 118 of the larger piston 103, which extension is in turn slidably mounted in a bore extending between the bore 102 and chamber 108. The hollow stem 117 is provided with openings 121 connecting the bore 115 through the interior passage 122 of the stem with openings 123, which communicate with the chamber 108 at all times. At the side of the piston 116 opposite the bore 115 is formed a valve chamber 125, within which is mounted a release valve 126 that is adapted to control communication between the valve chamber 125 and the chamber 104. The release valve 126 is provided with a restricted port 128 for permitting restricted communication between the chambers 125 and 104 at all times, and is normally urged into seated engagement with an annular seat member 129 which is interposed between the end of the piston 103 and a coil spring 130 mounted within the chamber 104. The release valve 126 is thus urged toward seated position under the force of a small coil spring 131 which is interposed between a collar on the end of a stem 132 of the valve, and an apertured seat member 133 engaging the seat member 129.

To the end of the hollow stem 117 within the chamber 108 is secured a valve stem 136, which is slidably mounted in a bore 137 formed in the casing and has a fluted portion 138 carrying a valve 139. The valve 139 is disposed in a valve chamber 140 and is urged toward seated position under the force of a spring 142 for normally closing communication between the valve chamber and a passage 143 communicating with a valve chamber 144. The valve chamber 140 is connected by way of a passage 145 with the conduit 39 leading to the piston chamber 38 of the brake release valve device 16.

The valve 139 is adapted to control the supply of fluid under pressure to either of the sanding devices 17 and 18 in accordance with operation of a sanding selector mechanism, which includes a valve element 148 disposed within the valve chamber 144 and connected by means of a stem 149 with a valve 150 that is disposed within a valve chamber 151 formed in the casing. The valve 148 is adapted to control communication from the chamber 144 by way of the bore containing the stem 149 to the sanding conduit 62, and carries a cage portion 153 having slidably mounted therein a plunger terminating in a valve 154, which is adapted to control communication from the chamber 144 through a passage 155 to the other sanding conduit 64. A coil spring 157 is interposed between the upper surface of the valve 148 and the lower surface of the plunger carrying the valve 154 for urging said elements apart, the spring being of such length as to hold the valve 154 in seated position only when the valve 148 is lifted from its seat as hereinafter explained. The chamber 151 is open to the atmosphere by way of an opening 160 and has slidably mounted therein a piston 161, which is adapted to operate the valves 150 and 148 and has formed at the lower side thereof a chamber 162 communicating by way of a passage 163 with the chamber 92. A coil spring 164 is interposed between a wall of the chamber 151 and the piston 162 for normally positioning the piston as shown in 161, and for thereby maintaining the valve 148 in seated position.

*Operation*

When the fluid pressure brake equipment shown in Fig. 1 is in condition for operation, fluid under pressure supplied to the reservoir 15 in the usual manner flows therefrom through the supply pipe 31 to the chamber 30 of the brake release valve device 16, and thence flows by way of the restricted port 40 in piston 33 to the piston chamber 38, and through the conduit 39 and passage 145 to the valve chamber 140 in the deceleration control valve device 20. It will be understood that the coil spring 122 normally maintains the valve 139 in seated position as shown in the drawings. With the brake valve device 14 in release position, the piston chamber 23 in the brake cylinder device 10 is maintained in communication with the atmosphere by way of the pipe 28 and the usual communications in the brake valve device.

Assuming that the vehicle is operated along the track in a direction to cause rotation of the wheel and axle assembly 11 in a counterclockwise direction, it will be apparent that the pumping gears 80 and 81 are driven at a speed corresponding to the rotative speed of the wheel to draw liquid from the supply chamber 78 through the intake pipe 94, past the check valve 93, and thence through the chamber 92 and passage 87 to the gear chambers 79, from which liquid is forced through the passage 86, past the discharge check valve 99, and through the chamber 96, passage 98 and chamber 97 to the bore 102. The pressure of liquid thus supplied to the bore 102 acts against the piston 103 to move the piston against the opposing force of the spring 130 and thus causes the piston to partially uncover the port 106, through which liquid under pressure then flows to the passageway 107. Liquid in the passageway 107 is free to flow therefrom to the chamber 108 and pipe 109 and thus to return to the supply chamber 78.

Liquid thus supplied to the passageway 107 also flows through the restricted passage 110 to the chamber 104, and thence by way of the restricted port 128 in the valve 126 to the chamber 125. I have found that the liquid will displace any air initially filling these chambers after a short period of operation.

It will be understood that the extent of movement of the piston 103 to uncover the port 106 is determined by the pressure of liquid supplied to the bore 102 by operation of the pumping gears 80 and 81, which are in turn driven in accordance with the speed of rotation of the associated wheel 11 of the vehicle. As the speed of the vehicle increases, the piston 103 will consequently be moved farther toward the left-hand in order to permit increased flow through the port 106 of liquid under pressure supplied by the pumping gears 80 and 81. As the piston 103 thus moves against the force of the spring 130, the spring seat member 129 and valve 126 are carried with the piston while liquid is at the same time forced from the chamber 104 through the restricted port 128 of the valve into the chamber 125. The smaller piston 116 of course remains stationary at this time due to engagement of the valve 139, carried on the end of the piston stem, with its seat.

The pressure of liquid within the chambers 125 and 104 is substantially the same as the fluid pressure within passage 107, chamber 108 and the supply chamber 78, which at this time may be approximately atmospheric pressure. The pressure of liquid within the intake pipe 94 and valve chamber 92 through which liquid is drawn by operation of the pumping gear is somewhat less than the fluid pressure in the supply chamber 78, so that the piston 161, which is subject to the pressure of liquid supplied to chamber 162 from valve chamber 92, is held in the normal position as shown in Fig. 1, under the force of spring 164. The sanding valves 148 and 149 are thus maintained in their respective seated and unseated positions, while the valve 154 is held in unseated position.

When it is desired to effect an application of the brakes, the self-lapping brake valve device 14 is operated to effect supply of fluid under pressure from the reservoir 15 to the supply pipe 28 and thence to the piston chamber 23 of the brake cylinder device 10. The piston 24 is thereby moved against the force of the spring 26 and through the medium of the piston rod 25 and associated brake rigging members, not shown, effects application of the usual brake shoes or other braking means to the wheel and axle assembly 11. The portion of the sleeve member 25a having the port 29 is thus carried outwardly of the cylinder end 21.

If the consequent deceleration of the vehicle is effected at a rate corresponding to the rate of deceleration of the wheel 11, so that any tendency of the wheel to slip on the rail is avoided, the pressure of liquid supplied to the bore 102 by the pumping gears 80 and 81 is reduced gradually, so that the spring 130 is permitted to shift the spring seat member 129, valve 126, and piston 103 to the right slowly enough to force liquid from the chamber 125 through the restricted port 128 to chamber 104 without exerting sufficient pressure on the piston 116 to overcome the force of spring 142. The valve 139 is thus still maintained in seated position.

If, however, the application of the brakes causes retardation of the wheel 11 at an excessive rate, so that the wheel begins to slip with respect to the rail, the relatively rapid reduction in speed of operation of the pumping gears 80 and 81 effects a correspondingly quick reduction in the pressure of liquid in the bore 102 acting on the piston 103. The spring 130 is thereby enabled to shift the spring seat member 129, valve 126 and piston 103 toward the normal position at a speed somewhat in excess of that which would permit complete displacement of liquid from the chamber 125 by way of the restricted port 128, so that liquid is momentarily entrapped within the chamber 125 and thus transmits sufficient pressure exerted by the spring 130 through the medium of the stem 117 and valve 139 to overcome the force of spring 142.

The valve 139 is thereby moved slightly away from its seat for permitting relatively restricted flow of fluid under pressure therepast, it being understood that the valve is not, under the operating condition now being described, moved to its fully unseated position. Fluid under pressure is supplied at a relatively slow rate of flow from the supply pipe 31 through the chamber 30 in the brake release valve device 16, the restricted port 40 in the piston 33, chamber 38, conduit 39, passage 145 in the deceleration control valve device 26, and then past the slightly unseated valve 139 and through passage 143, chamber 144, passage 155 and conduit 64 to the sanding device 17, which is thereby operated to supply sand through the sanding pipe 65 to the rail in advance of the wheel 11. The presence of sand on the rail will usually increase the coefficient of friction between the rail and wheel 11 sufficiently to cause the wheel to pick up or increase its rotative speed in time to avoid serious wheel slipping. Upon the resultant increase in the speed of operation of the pumping gears 80 and 81, further reduction in pressure of liquid in the bore 102 is prevented. Meanwhile, due to continued flow of liquid from the chamber 125 through the restricted port 128 of valve 126, the spring 142 becomes effective to permit the piston 116 to be returned to its normal position under the force of the spring 142, while the valve 139 is again moved to seated position. Further supply of sand to the rails is thus stopped.

Let it now be assumed that an application of the brakes is effected with such force as to cause deceleration of the wheel and axle assembly 11 at a rate in excess of the maximum rate permissible without causing wheel sliding, with the result that the speed of operation of the pumping gears 80 and 81 is rapidly reduced, thus causing a relatively sudden decline in the pressure of liquid supplied to the bore 102. Upon the quick reduction of liquid pressure within the bore 102 the piston 103 and spring seat member 129 are rapidly shifted under the force of the spring 130 toward normal position. As the spring seat member 129 and the valve 126 seated thereon are thus quickly moved toward the piston 115, liquid is entrapped therebetween due to the slow rate of flow permitted by the restricted port 128, and the piston 116, stem 117, and valve 139 are consequently forced to the right under the pressure of the spring 130 in opposition to the pressure of the spring 142. Because of the sudden movement of the piston 103, spring seat member 129 and valve 126 under the force of the spring 130 as just explained, only a relatively small amount of the liquid entrapped within the chamber 125 has time to flow therefrom to the chamber 104 by way of the restricted port 128, so that substantially the full force of the spring 130 is transmitted to the piston 116, which is thus operated to move the valve 139 to its fully unseated position.

With the valve 139 thus unseated, fluid under pressure is vented from the piston chamber 38 of brake release valve device 16 by way of the conduit 39, past the unseated valves 139 and 154 and through conduit 164 to the sanding device 17 at a faster rate than that of flow of fluid from the chamber 30 through the restricted port 40 in piston 33. Consequently, while the sanding device 17 is thereby operated in the usual manner to effect supply of sand through the sanding pipe 65 to the rail in advance of the wheel, the pressure of fluid in the chamber 30 moves the piston 33 upwardly and thereby lifts the valve 32 away from the seat rib 34, the valve 46 being meanwhile maintained in engagement with the seat rib 47 under the force of the spring 44, which force is now greater than is normally the case, due to compression of the spring. When the valve 32 is thus unseated, fluid under pressure is supplied from the supply pipe 31 by way of the chamber 30 and pipe 36 to the chamber 27 in the brake cylinder device 19, the piston 24 of which is then quickly moved toward release position by the force of the spring 26 upon substantial equalization of the pressures in chambers 23 and 27.

In response to the release of the brakes initiated as just explained, the wheel and axle assembly 11, aided by the increased traction resulting from the depositing of sand on the rail, again picks up speed until the rotative speed thereof corresponds with that of the vehicle, while the pumping gears 80 and 81 are driven to increase the supply of liquid under pressure to the bore 102 for again shifting the piston 103 and associated elements to the left against the force of the spring 130. Upon the quick movement of the piston 103 as just explained, the liquid within the chamber 104 is for a time subjected to a slightly increased pressure, since flow of liquid from the chamber through the restricted passage 110 to the passageway 107 is restricted while the spring 113 resists opening of the check valve 112, and the valve 126 is consequently unseated against the biasing force of the spring 131 for admitting liquid under pressure from the chamber 104 to the chamber 125, where the pressure of the liquid is effective through the medium of the piston 116 and stem 117 to maintain the valve 139 unseated.

It will thus be seen that, during such time as is required for the speed of rotation of the axle assembly 11 to increase from the rate at which it began to slip to a rate corresponding to the vehicle speed, fluid under pressure is continuously supplied from the piston chamber 38 of brake release valve device 16 to the sanding device 17, while the valve 32 is maintained unseated for supplying fluid under pressure to the chamber 27 of the brake cylinder device 10, as hereinbefore explained. In other words, the rail is sanded and the brakes held released to permit complete restoration of the rotative speed of the wheel and axle assembly to a rate corresponding with the speed of the vehicle.

The return of the rotative speed of the wheel 11 to a value corresponding to the speed of the vehicle, following the temporary release of the brakes as explained, is usually effected rapidly, and while the brakes associated with other wheels of a vehicle are still maintained applied. It is consequently desirable that a reapplication of the brakes for the wheel 11 be effected automatically after the wheel slipping condition has been corrected.

Figure 4:
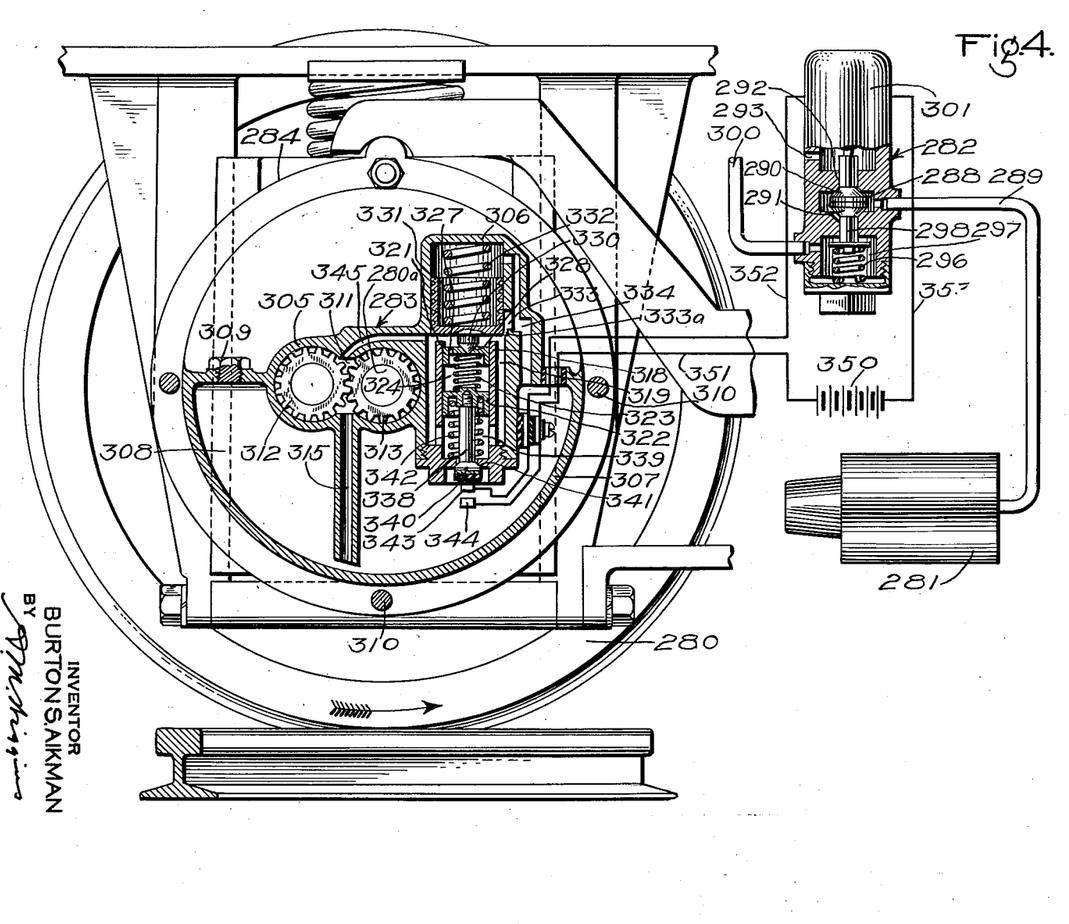
Fig. 4 is a diagrammatic elevational view, mainly in section, of still another form of brake controlling mechanism embodying features of the invention.

After movement of the piston 103 under the increased pressure of liquid in the bore 102 has been completed during restoration of the rotative speed of the wheel to the vehicle speed, the pressure of liquid in the connected chambers 104 and 125 again becomes equalized with that of the passageway 107. The valve 139, which had been maintained unseated by the pressure of liquid in the chamber 125 during the aforementioned operation of the acceleration control valve device 20, is then moved to the left to seated position under the force of the spring 142, the stem 117 and piston 116 being moved in the same direction to expel liquid from the chamber 125 through the restricted port 128 in valve 126, which is meanwhile returned to seated position by the spring 131. When the valve 139 is thus moved to seated position, further flow of fluid under pressure to the passage 143 and thence to the sanding device 17, is stopped, while the pressure of fluid in the chamber 38 of the brake release valve device 16 is quickly increased toward equalization with the fluid pressure in chamber 30, by flow of fluid through the restricted port 40. When the fluid pressures in chambers 30 and 38 become equalized, the piston 33 is operated to move valve 32 into engagement with the seat rib 34, under the force exerted by the spring 44 on the stem 41, so that the supply of fluid under pressure to the chamber 27 of the brake cylinder device 10 is cut off, while fluid under pressure begins to flow from the chamber 27 to atmosphere by way of pipe 36, bore 35, and past the valve member 46. The spring 44 at this time exerts only its normal force to oppose unseating of the valve, since the collar 45 has been returned to the lower position as shown in Fig. 4.

Assuming that the supply of fluid under pressure by way of the brake valve device 14 and the pipe 28 to the piston chamber 23 of the brake valve device is still continued, the piston 24 is again forced to the right against the pressure of the spring 26 for effecting reapplication of the brakes. The spring 44, however, is adapted to move the valve element 46 into engagement with the seat 47 for cutting off complete flow of fluid under pressure from the spring chamber 27 when the fluid pressure therein has been reduced to a predetermined value, it being understood that the port 29 of the sleeve 25a is still held outwardly of the end 21 of the brake cylinder casing, so that the fluid pressure acting in the chamber 23 on the brake cylinder piston 24 is not effective to cause reapplication of the brakes to the same degree of force as existed prior to the slipping of the wheel.

When it is desired to effect the release of all brakes on the vehicle, the valve device 14 is moved to release position for venting the pipe 28 and brake cylinder chamber 23 to the atmosphere, whereupon the spring 22 moves the piston 24 and rod 25 to release position. As the port 29 in the hollow brake cylinder rod 25 is thus brought into communication with the chamber 27, the fluid under pressure remaining therein is discharged to the atmosphere, so that the brake cylinder device is then in condition for subsequent operation to effect application of the brakes in the usual manner.

If the vehicle is driven along the rail in the opposite direction, so that the wheel and axle assembly 11 is rotated in a clockwise direction, the pumping gear 80 is likewise rotated in a clockwise direction for turning the pumping gear 81 in a counterclockwise direction, thereby drawing liquid from the supply reservoir 78 through the intake pipe 90, past inlet valve 89, and through chamber 88 to the chamber 79, from which the liquid is forced under pressure through the passage 87 and past the discharge valve 100 to the bore 102 for operating the piston 103 in the manner hereinbefore explained. At the same time liquid under pressure is supplied from the passage 87 through chamber 92 and passage 163 to the piston chamber 162, and moves the piston 161 upwardly against the force of the spring 164, thereby seating the valve 150 and unseating the valve 148. As the valve 148 is moved upwardly and away from its seat the valve 154 is lifted into seated position under the pressure of the spring 157. The several valve elements are thus positioned to condition the sanding device 18 for operation, while the sanding mechanism 17 at the trailing side of the wheel and axle assembly 11 is rendered inoperative.

If an application of the brakes is now effected with excessive force, causing the wheel 11 to slip with respect to the rails so as to effect operation of the deceleration control valve device 20 in the manner hereinbefore explained, the consequent unseating of the valve 139 will effect supply of fluid under pressure in the usual manner from the valve chamber 140 and through the passage 143 and chamber 144, past the unseated valve 148, and through the conduit 62 and nozzle 61 to sand chamber 57 of sanding device 18. Sand is thereby driven from the sand chamber and through the sand pipe 58 to the rail in advance of the wheel 11.

Figure 3:
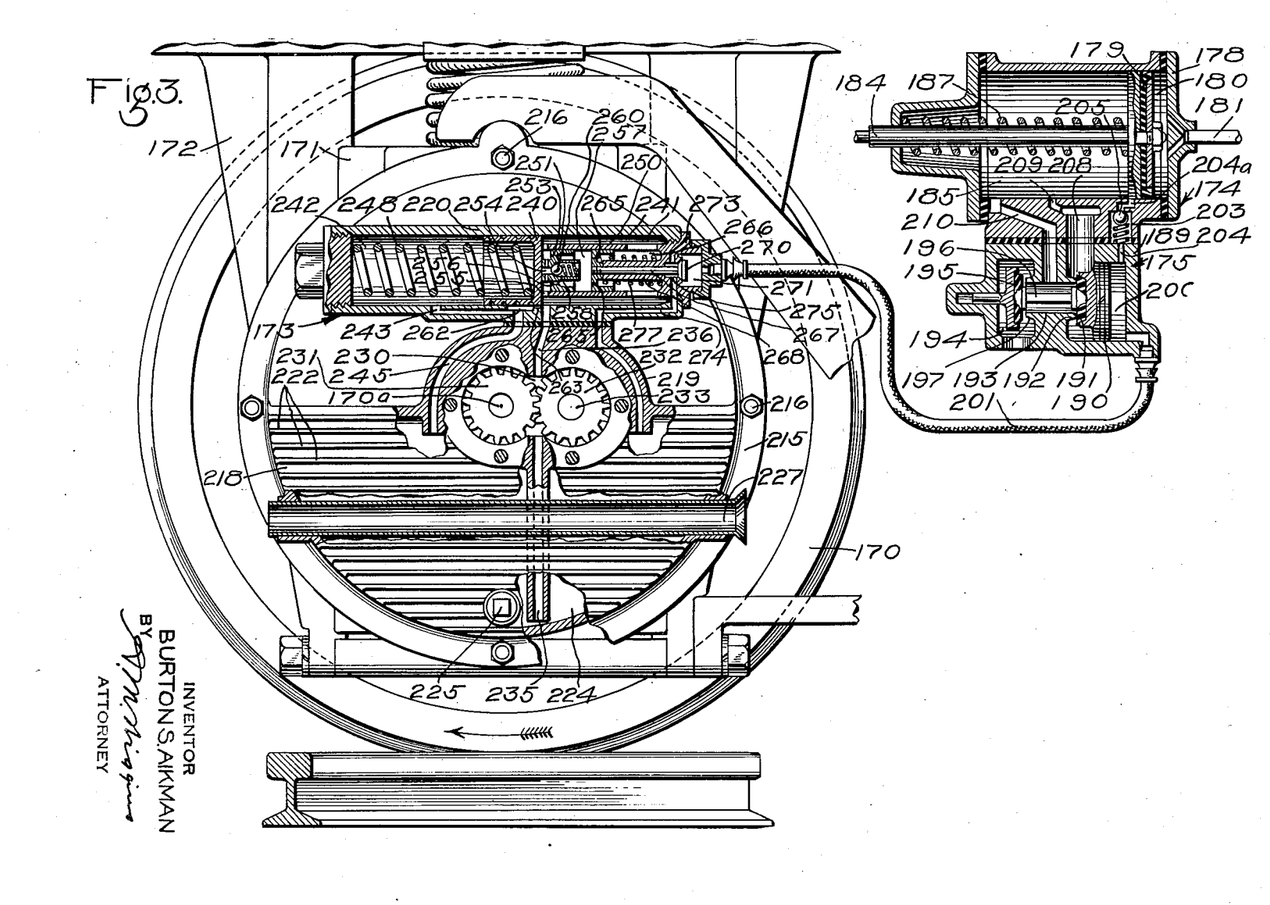
Fig. 3 is a diagrammatic elevational view, mainly in section, of another form of brake controlling equipment embodying features of the invention.

*Equipment shown in Fig. 3*

A somewhat different form of brake control apparatus embodying features of the invention is shown in Fig. 3 of the drawings, which illustrates braking equipment adapted for association with a single wheel, or wheel and axle assembly of the vehicle. A vehicle truck is shown in fragmentary form in Fig. 3 and includes a wheel and axle assembly 170, which is rotatably mounted in suitable journal assemblies such as 171, that are in turn adapted to carry a truck frame structure 172. The brake control apparatus comprises a deceleration control valve device indicated generally by the character 173, and a brake cylinder device 174 having associated therewith a brake release valve device 175.

The brake cylinder device 174 comprises a cylinder casing 178 having slidably mounted therein a piston 179, which has formed at one side thereof a piston chamber 180 to which fluid under pressure may be supplied by way of suitable communications including a pipe 181. The piston 179 has a piston rod 184 which is suitably connected to the usual braking means associated with the wheel and axle assembly 170, and is disposed within a spring chamber 185 formed at the side of the piston 179 opposite the chamber 180. A coil spring 187 is interposed between the piston 179 and the end wall of chamber 185 for urging the piston toward release position as shown in the drawing.

The brake release valve device 175 comprises a casing 189 which is secured to the casing 178 of the brake cylinder device by suitable means, not shown, and which has formed therein a bore in which is mounted a piston 190 having a valve portion 191. The valve portion 191 is adapted to engage a seat rib 192 formed on the casing adjacent an interior passage 193, which communicates through a passage 210 with chamber 185 and with the atmosphere by way of an open cavity 194. Within the cavity 194 is mounted a valve 195 that is connected to the valve portion 191 by means of a stem 196 extending through the passage 193. The valve 195 is adapted to be moved into engagement with a seat rib 197, but is normally held spaced therefrom while the valve portion 191 engages the seat rib 192 as shown in the drawing. At one side of the piston 191 is formed a chamber 200 which communicates with a conduit 201 leading to a valve chamber of the deceleration control valve device 173 hereinafter described. The chamber 200 also communicates by way of a restricted passage 204 and a valve chamber 203 with a port 204a in the wall of the piston bore containing the brake cylinder piston 179, which port is adapted to communicate with chamber 180 upon initial movement of the piston toward brake application position as hereinafter explained. A spring-pressed ball check valve 205 is mounted within the valve chamber 203 for preventing back flow of fluid from the chamber 200 to the port 204a. At the side of the piston 190 adjacent the valve portion 191 is formed a chamber 208 which communicates with a port 209 in the wall of the brake cylinder piston bore that is adapted to be uncovered by the piston 179 as it approaches its maximum brake application position.

The deceleration control valve device 173 comprises a casing structure including a mounting flange portion 215 which is adapted to be secured to the journal box structure 171 by suitable means such as bolts 216, a liquid supply reservoir portion 218 carried by the flange portion, a pump portion 219, and a valve portion 220. The reservoir portion 218 of the casing structure is provided with exterior cooling fins 222 and has formed therein a liquid supply reservoir 224 adapted to contain a quantity of oil or other suitable liquid, which may be supplied thereto by way of a suitable aperture normally closed by a removable plug 225. A plurality of air conduits 227 are preferably mounted within the chamber 224 for cooling the liquid contained therein. The ends of the cooling conduits 227 are open to the atmosphere outwardly of the reservoir portion 218 of the casing structure and are adapted to be suitably secured thereto by solder or other means preventing leakage of liquid from the chamber 224.

The pump portion 219 of the casing structure has formed therein a pumping gear chamber 230 within which are mounted a pair of pumping gears 231 and 232, the gear 231 being keyed or otherwise secured to an extension 170a of the axle and thus adapted for rotation with the wheel 170. The pumping gear 232 is mounted on a shaft 233 which is suitably journaled in the pump portion of the casing structure. When the pumping gear 231 is rotated by the wheel and axle assembly in a clockwise direction it is adapted to cooperate with the other gear 232 for drawing liquid from the reservoir 224 through an intake pipe 235 to the chamber 230, from which liquid is forced under pressure into a passage 236, as hereinafter explained. In order to avoid complication of the drawings the pumping gears 231 and 232 have thus been illustrated as adapted for operation in one direction only, but it will be obvious that by the provision of suitable valves such as those shown in association with gears 80 and 81 of Fig. 1, the pumping mechanism could be rendered operative for either direction of rotation of the associated wheel and axle assembly.

The valve portion 220 of the casing structure has formed therein a longitudinal bore in which is slidably mounted a piston 240 having at one side thereof a chamber 241 communicating with passage 236 and on the opposite side thereof a spring chamber 242 communicating by way of a passage 243 with a passage 245 leading to the liquid supply chamber 224. A coil spring 246 is interposed between the end wall of the chamber 242 and the piston 240 for urging the piston into engagement with the end of a cylinder member 250, which extends concentrically within the chamber 241 and has screw-threaded connection in a suitable aperture in the end of the casing portion 220. The cylinder member 250 has a bore 251 formed therein parallel to that in which the piston 240 is slidably mounted, which bore is adapted to receive an auxiliary piston 253 having a stem 254 that is secured in a suitable manner with the piston 240. The face of the piston 253 adjacent the piston 240 is subject to fluid pressure in the chamber 241, it being noted that the end of the cylinder member 250 abutting the piston 240 is provided with a plurality of channels 255, while the other face of the piston 253 is exposed to a chamber 257 communicating with the chamber 241 by way of a passage 258 formed in the stem 254. A spring pressed ball check valve 260 is interposed in the passage 258 for preventing flow of fluid therethrough from the chamber 257, although communication between the chambers 241 and 257 is always maintained by way of a calibrated or restricted port 256 formed in the piston 253.

The piston 240 is adapted to function in a manner similar to that of operation of piston 103 shown in Fig. 1, to control communication from the chamber 241 through port 262 having a variable flow area to the passage 245 leading to the liquid supply chamber 224, the extent of movement of the piston in uncovering the port 262 being determined in accordance with variations in the pressure of liquid supplied by the pumping gears to the chamber 241 as hereinafter explained. The port 262 has a restricted portion 263 which is adapted to permit flow of liquid from the chamber 241 to the passage 245 at a limited rate when the piston 240 is in engagement with the end of the cylinder member 250 as shown in the drawings.

Slidably mounted in the bore 251 of the cylinder member 250, and in alignment with the piston 253, is a piston 265, which has at one side the chamber 257 and at the other side a chamber 266 which is open to the chamber 241 by way of apertures formed in the cylinder member. The piston 265 has a stem 267 slidably mounted in a sleeve portion 268 extending interiorly of the cylinder member. The stem 267 terminates in a valve 270 that is disposed in a valve chamber 271 communicating with the conduit 201, which valve is adapted to control flow of fluid under pressure from the chamber 271 to the atmosphere by way of an exhaust port 273. Surrounding the end of the stem 267 adjacent the valve 270 is an annular groove 275 which communicates with a liquid return passage 274 by way of which liquid leaking past the stem 267 may flow back to the supply chamber 224. A coil spring 277 is interposed between the end wall of the chamber 266 and the piston 265 for urging the piston toward the piston 253, movement of the piston in that direction being stopped upon engagement of the valve 70 with its seat as shown in Fig. 3.

Operation

When the vehicle is operated in a direction to cause rotation of the wheel and axle assembly 170 in a clockwise direction, the pumping gears 231 and 232 are thereby driven to pump liquid from the reservoir 224 into the chamber 241 at a pressure proportional to the speed of rotation of the wheel and axle assembly. The piston 240 is moved against the force of the spring 248 by the pressure of liquid in the chamber 241, and carries with it the smaller piston 253, while liquid from the chamber 241 fills the chamber 266, and flows by way of the restricted port 256 and passage 258 to the chamber 257 between the pistons 253 and 265. As the piston 240 is moved to the left, as viewed in the drawing, it uncovers the port 262 for permitting return flow of liquid under pressure from the chamber 241 through the port and passage 245 to the reservoir 224.

If the speed of the vehicle is reduced at a normal rate, the pumping gears 231 and 232 are consequently operated to supply liquid to the chamber 241 at a slower rate, and as the pressure of liquid is reduced the piston 240 and piston 253 are gradually moved to the right under the pressure of the spring 248, while liquid in the chamber 257 is permitted to flow through the restricted port 256 to the chamber 241 without exerting appreciable pressure on the piston 265.

When fluid under pressure is supplied in the usual manner by way of the brake cylinder pipe 181 to the piston chamber 180 of the brake cylinder device 174, in initiating an application of the brakes, the piston 179 and piston rod 184 are thereby operated to actuate the usual braking mechanism associated with the wheel and axle assembly 170 in the drawing. As the brake cylinder 179 over travels the port 204a, fluid under pressure is supplied from the chamber 180 past the ball check valve 205 to the piston chamber 200 in the brake release valve device 175, and the piston 190 is thereby subjected to fluid pressure for insuring seating engagement of the valve 191 with the valve seat rib 192 as shown in the drawing. When the brake cylinder piston 179 moves far enough toward brake application position to establish communication between the chamber 180 and port 209, fluid under pressure is admitted to the chamber 208, and acts on the smaller area of the piston 190 exposed to that chamber in opposition to the pressure of fluid in chamber 200. It will be noted that fluid under pressure in the chamber 200 is also free to flow therefrom by way of the conduit 201 to the valve chamber 271 in the deceleration control valve device 173.

If the application of the brakes effected in the manner just explained causes reduction in the rotative speed of the wheel and axle assembly 170 at a rate not exceeding a predetermined safe rate of deceleration, i. e., at a rate of deceleration not likely to result in slipping of the wheels, the associated pumping gears 231 and 232 are operated at a correspondingly decreasing rate of speed, so that the pressure of liquid supplied to the chamber 241 is gradually reduced, while the spring 248 becomes effective to shift the pistons 240 and 253 to the right and toward the normal position illustrated in Fig. 3 of the drawings. In thus gradually moving toward the piston 265 the piston 253 displaces liquid from the chamber 257, the liquid flowing therefrom through the restricted port 256 of the piston 253 to the chamber 241, while the pressure of liquid acting on the piston 256 remains substantially constant. The spring 277 thus still remains effected to maintain the valve 270 in seated position as shown in the drawings.

Should the brakes be applied on the wheel and axle assembly 170 with such force as to cause wheel slipping, however, the speed of operation of the pumping gears 231 and 232 is consequently reduced at such a rate as to effect a sudden reduction in the pressure of liquid supplied to the chamber 241, so that the spring 248 is rendered effective to move the pistons 240 and 253 toward their normal position at a speed greater than that with which the liquid entrapped within chamber 257 can be displaced therefrom by flow through the restricted port 256. The movement of the piston 253 is consequently transmitted through the liquid in chamber 257 to the piston 265, which, together with stem 267 is moved outwardly against the force of the spring 277 to unseat the valve 270.

With the valve 270 thus moved to unseated position, fluid under pressure is quickly vented from the chamber 200 by way of the conduit 201, chamber 271, past the valve, and through the atmospheric passage 273. At the same time, fluid under pressure is released at a slow rate from the piston chamber 180 of the brake cylinder device by way of the passage 204, past the ball check valve 205 and restricted passage 204a communicating with the chamber 200. Upon a predetermined reduction in the fluid pressure in chamber 200 the pressure of fluid in the chamber 208 forces the piston 190 to the right as viewed in Fig. 3, thereby seating the valve 195 and moving the valve 191 away from the seat rib 192, for establishing communication from the chamber 208 through the passage 210 to the spring chamber 185 of the brake cylinder device. It will be understood that the brake application position of the brake cylinder piston 179 is in the region of the piston bore intermediate the ports 210 and 209, and that equalization of the fluid pressures acting on opposite sides of the piston will quickly follow the flow of fluid from the chamber 180 past the unseated valve 181 to the spring chamber 185. Upon substantially equalization of pressures in chambers 180 and 185 the spring 187 is rendered effective to shift the piston 179 and the usual brake rigging elements connected thereto toward their release position.

Upon operation of the deceleration control valve device 187 to effect the release of the brakes as just explained, the tendency of the wheel 170 to slide along the rail is overcome, and the wheel and axle assembly is again free to rotate at the speed at which the vehicle is then traveling. The associated pumping gears 231 and 232 are consequently operated at increased speeds for building up the pressure of liquid in the chamber 241, the increased pressure forcing the piston 240 to the left against the pressure of the spring 243, while the piston 253 is correspondingly withdrawn from the chamber 257. Due to this movement of the piston 253, and also by reason of the fact that a portion of the liquid previously entrapped within the chamber 257 has meanwhile had time to flow through the restricted port 256 to the chamber 241, the spring 277 becomes effective to shift the piston 265, stem 267 and valve 270 to the left, as viewed in Fig. 3, until the valve engages its seat for cutting off further flow of fluid under pressure from the chamber 271 to the atmosphere.

A reapplication of the brakes may then be effected, by further supplying fluid under pressure by way of pipe 181 to the brake cylinder piston chamber 180 for increasing the pressure in that chamber and in the piston chamber 209 in the brake release valve device.

Upon the increase in the pressure of fluid in the piston chamber 209, the valve 191 is again shifted to seated position as shown in the drawings, while the valve 195 is unseated for venting fluid under pressure from the spring chamber 185 to the atmosphere, thereby permitting the pressure of fluid in the chamber 180 to shift the piston 179 to brake application position.

*Equipment shown in Fig. 4*

Still another embodiment of the invention is illustrated in Fig. 4 of the drawings, in which there is shown a wheel and axle assembly 280 adapted to have associated therewith the usual braking means operable by a brake cylinder device 281, a magnet valve device 282, and a deceleration control valve device 283 which may be suitably mounted on a journal box structure 284 associated with the wheel and axle assembly.

The brake cylinder device 281 may be of any conventional type operative to effect application and release of the brakes, not shown, for controlling the wheel and axle assembly 280, and is adapted to be supplied with fluid under pressure in accordance with operation of the magnet valve device 282, which comprises a casing having a valve chamber 288 communicating with a brake cylinder supply pipe 289, and having mounted therein a pair of valves 290 and 291. The valve 290 is adapted to control communication from the chamber 288 through a bore 292 and passage 293 to the atmosphere, and is normally maintained in seated position under the force exerted by a spring 296, which is interposed between one wall of a chamber 297 and a fluted stem 298 of the valve 291. The spring 296 normally maintains the valve 291 in unseated position as shown in the drawing, so that fluid under pressure may be supplied to the brake cylinder device 281 by way of a supply pipe 300, the chambers 297 and 288, and supply pipe 289. Mounted in the upper portion of the casing is a magnet, indicated by the character 301, which is adapted to be energized for effecting movement of the valves 291 and 290 to their respective seated and unseated positions, upon the closing of an electric circuit as hereinafter explained.

The deceleration control valve device 283 comprises a casing structure having a pump portion 305 and a valve portion 306, which are formed integral with or may be secured to a reservoir portion 307 which is in turn mounted on the journal box structure 284 by means of bolts 310. The reservoir portion 307 has formed therein a liquid supply chamber 308 containing a quantity of liquid that may be supplied thereto by way of a filling opening closed by a plug 309. Formed within the pump portion 305 of the casing structure is a chamber 311 in which are mounted a pumping gear 312 and a similar gear 313, the latter of which is secured to an extension 280a of the axle, or is otherwise arranged to be driven by the wheel and axle assembly 280. The gears 312 and 313 are adapted to be operated to draw liquid from the chamber 308 through an intake pipe 315 to the chamber 311.

The acceleration control valve device further comprises a cylinder member 318 which is mounted within a chamber 319 formed in the valve portion 306, which cylinder portion is provided with a bore having slidably mounted therein a pair of pistons 321 and 322 that are normally spaced apart by means of a spring 323 disposed in a chamber 324 between the pistons. The piston 321 has a restricted port 327 forming an always open communication between the chambers 319 and 324, and is also provided with a somewhat larger port 328 which is normally closed by a valve 330 carried on a piston 331 subject to the opposing pressures of liquid supplied to the chamber 319 and of a spring 332. The piston 331 controls communication from the chamber 319 through a port 333 to a discharge passage 334 communicating with the liquid supply chamber 308. A restricted portion 333a of the port is adapted to provide communication from the chamber 319 to the passage 334 when the piston 331 is in the normal position shown in Fig. 4.

The piston 322 has secured thereto a stem 338, which extends through a chamber 339 communicating with the passage 319 and terminates in a valve member 340, which is normally held in engagement with a seat 341 under the force of a spring 342 interposed between the piston and the lower wall of the chamber 339. Mounted in operative alignment with the lower surface of the valve member 340 is a spring biased contact element 343, which is adapted to be forced downwardly thereby into engagement with a contact element 344 to close a circuit for energizing the magnet 301 of the magnet valve device 282, as hereinafter explained. It will be understood that the contact elements 343 and 344 are illustrated in diagrammatic form in Fig. 4.

*Operation*

Let it be assumed that the vehicle is moved along the track so as to cause rotation of the wheel and axle assembly 280 in a counterclockwise direction, and that the pumping gears 313 and 312 are thereby operated to supply liquid from the chamber 308 through the pipe 315, chamber 311 and a passage 345 to the chamber 319 at a pressure corresponding with the rotative speed of the wheel and axle assembly. Liquid under pressure thus supplied to the chamber 319 flows therefrom into the chamber 339, and through the port 328, which may be opened momentarily due to downward movement of the piston 321 against spring 323, and the restricted port 327 in the piston 321 to the chamber 324, it being understood that air initially present in these chambers is driven out after a short period of time. The pressure of liquid in the chamber 319 at the same time acts against the piston 331 to force the piston upwardly against the pressure of the spring 332, thereby uncovering the port 333 for permitting liquid to flow from the chamber 319 through the passage 334 to the supply chamber 308.

As the piston 331 is moved upwardly, the spring 323 is rendered effective to move the smaller piston 321 in the same direction, so that the port 328 is maintained closed by the valve 330 carried by the larger piston. As the chamber 324 between the piston 321 and 322 is thus expanded, liquid from the chamber 319 is further supplied thereto through the restricted port 327. The extent of movement of the piston 331, and consequently of the piston 321, will of course be determined by the speed of rotation of the wheel and axle assembly 280, since the pressure of liquid supplied to the chamber 319 depends upon the speed at which the pumping gears 312 and 313 are operated by that assembly.

When it is desired to effect an application of the brakes, the usual brake controlling valve device, not shown, is operated to supply fluid under pressure through the pipe 300, chamber 297 in magnet valve device 282, chamber 288, and pipe 289 to the brake cylinder device 281, which is thereby operated to apply power to the usual brake rigging mechanism, not shown in the drawing. As the rotative speed of the wheel and axle assembly 280 is reduced due to application of the brakes, the pumping gears 312 and 313 are operated at correspondingly lower speed, while the pressure of liquid in chamber 319 is consequently reduced to permit gradual downward movement of the pistons 331 and 321 under the force of the spring 332. Assuming that the application of the brakes just described is effected to a normal degree and that the wheel and axle assembly 280 is retarded at a rate not producing sliding of the wheels, the downward movement of the piston 321 causes liquid in the chamber 324 to flow therefrom by way of the restricted port 327 to the chamber 319, while the piston 322 is held stationary under the force exerted by the spring 342. The valve 340 is accordingly maintained in engagement with the seat 341 and spaced from the contact element 343.

If the application of the brakes is effected with too heavy a force with respect to the rotative speed of the wheel and axle assembly 280, so that the wheels begin to slip and consequently to decelerate at a rate in excess of that for which the deceleration control valve device 283 is initially conditioned, the resultant reduction in speed of operation of pumping gears 312 and 313 effects a relatively sudden reduction in the pressure of liquid supplied to the chamber 319. Upon the sudden reduction of the liquid pressure in the chamber 319, the spring 332 becomes effective to move the piston 331 and piston 321 downwardly at a rapid rate, and as the liquid entrapped in the chamber 324 cannot immediately be forced therefrom through the restricted port 327, the piston 322 is consequently forced downwardly against the pressure of the spring 342, and the valve 340 is thereby unseated. With the valve 340 unseated, liquid is quickly discharged from the chamber 339 to the supply chamber 308 while the fluid pressure still acting on the piston 331 is reduced to that of the supply chamber, whereupon the spring 332 acts through the medium of the several pistons to shift the valve member 340 to its lowermost position for moving the contact element 343 into engagement with the contact element 344.

Upon engagement of the contact elements 343 and 344, the magnet 301 of the magnet valve device 282 is energized through a circuit which includes the positive terminal of a battery 350, a conductor 351, the connected contact elements, a conductor 352, the magnet winding, and a conductor 353 leading to the negative terminal of the battery. When the magnet 301 is energized, the valves 290 and 291 are shifted against the pressure of the spring 296 to their respective unseated and seated positions, thus cutting off further supply of fluid under pressure to the brake cylinder device 281, which is at the same time vented to the atmosphere by way of the unseated valve 290, bore 292, and atmospheric discharge port 293. The equipment is thus operative to effect the release of the brakes in time to prevent sliding of the wheel 280 along the rail.

Liquid is meanwhile caused to flow from the chamber 324 between the pistons 322 and 321 through the restricted port 327 to the chamber 319, due to the upward force of the spring 342 exerted through the medium of the piston 322, which piston is finally moved upwardly to cause reengagement of the valve 340 with the seat 341, thus permitting the contact element 343 to disengage the element 344. The circuit for energizing the magnet 301 is thereby broken, and the spring 296 of the magnet valve device then becomes effective to move the valve 290 into seated position while unseating the valve 291. With the valve 291 thus unseated, further supply of fluid under pressure to the brake cylinder 281 may be resumed for effecting a reapplication of the brakes.

Summary

From the foregoing it will be apparent that a brake control equipment constructed in accordance with any of the several forms of my invention comprises liquid pumping means operative in accordance with the rotative speed of a vehicle wheel to vary the pressure of liquid acting on a movable abutment, which is responsive to a sudden reduction in said pressure to cause quick release of the brakes to prevent sliding of the wheel, and is responsive to subsequent pick-up in rotative speed of the wheel to permit reapplication of the brakes.

While several illustrative embodiments of the invention have been described in detail, it is not intended to limit the invention to those embodiments or otherwise than by the terms of the appended claims.

Having now described my invention, what I claim as new and desire to secure by Letters Patent, is:

1. In a brake equipment for a vehicle wheel, braking means, brake control means cooperative with said braking means to vary the braking force on said wheel, and deceleration governor means including a pump driven by said wheel for supplying liquid under a pressure varying in accordance with the speed thereof, a spring, movable abutment means subject to the opposing pressures of said spring and of the liquid supplied by said pump for controlling a discharge communication therefor, a piston movable relatively to the abutment means and operative to actuate said brake control means, means for entrapping liquid between said abutment means and said piston to render the piston responsive to quick movement of the abutment means, and means for gradually releasing said liquid during slow movement of the abutment means.

2. Deceleration control apparatus for governing the brakes for a vehicle wheel, comprising brake release means operable to effect release of the brakes, speed responsive mechanism operative to establish a fluid pressure proportional to the rotative speed of said wheel, a movable abutment subject to said fluid pressure and to a substantially constant opposing pressure, a piston normally operable by said movable abutment to displace liquid from a chamber by way of a restricted passage, and means responsive to pressure transmitted through liquid entrapped in said chamber upon sudden movement of said piston to actuate said brake release means.

3. Deceleration control apparatus for governing the brakes for a vehicle wheel, comprising brake release means operable to effect release of the brakes, speed responsive mechanism operative to establish a fluid pressure proportional to the rotative speed of said wheel, a movable abutment subject to said fluid pressure and to a substantially constant opposing pressure, a first piston having a restricted aperture and operative by said movable abutment through a chamber containing a quantity of liquid, and means for actuating said brake release means including a second piston subject to the pressure of liquid in said chamber.

4. Deceleration control apparatus for governing the brakes for a vehicle wheel, comprising brake release means operable to effect release of the brakes, speed responsive mechanism operative to establish a fluid pressure proportional to the rotative speed of said wheel, a movable abutment subject to said fluid pressure and to a substantially constant opposing pressure, an element movable by said abutment through a chamber adapted to contain a quantity of liquid, means for effecting restricted flow of liquid from one side of said element to the other during normal gradual movement thereof by said abutment, and means for actuating said brake release means including a piston subject to the pressure of liquid entrapped at one side of said element upon sudden movement thereof due to a change in the rotative speed of said wheel at an undesirable rate.

5. Deceleration control apparatus for governing the brakes for a vehicle wheel, comprising brakes release means operable to effect release of the brakes, a pump operative to supply fluid to a chamber at a pressure proportional to the rotative speed of the wheel, a piston subject to the variable pressure of fluid in said chamber and to a substantially constant opposing pressure, a movable abutment associated with said piston and having a restricted port through which fluid can flow to a bore at one side thereof when operated by said piston in response to an increase in the pressure of fluid in said chamber, a spring, and means including another piston interposed between said spring and said bore for actuating said brake release means in response to pressure transmitted through the medium of fluid entrapped in said bore due to sudden movement of said movable abutment.

6. In a brake equipment for a wheel of a vehicle, in combination, brake release means operative to effect quick release of the brakes, a reservoir adapted to contain a quantity of liquid, a casing having a chamber, a pump operative to supply liquid from said reservoir to said chamber at a rate proportional to the rotative speed of said wheel, a spring, a movable abutment subject to the opposing pressures of said spring and of liquid in said chamber for varying the flow area of a return passage leading therefrom to the reservoir, another movable abutment operative by the first mentioned abutment to vary the volume of a bore communicating through a restricted port with said chamber, a piston subject to the pressure of liquid in said bore, and means operative by said piston upon a predetermined increase in pressure of liquid in said bore for effecting operation of said brake release means.

7. Deceleration control apparatus for controlling the brakes associated with a wheel of a railway truck including a journal box, comprising brake release means operative to effect quick release of the brakes, a casing structure adapted to be carried by the journal box associated with the wheel and having formed therein a liquid supply reservoir and a pressure chamber, a pump mounted in said casing structure and operative to supply liquid from said reservoir to said chamber at a rate proportional to the rotative speed of said wheel, a movable abutment controlling a return passage from said chamber to said reservoir and movable through a range of positions corresponding to variations in the pressure of liquid in said chamber, and means responsive to hydraulic pressure created upon sudden movement of said abutment from one position to another for actuating said brake release means.

8. A brake controlling equipment for governing operation of the brakes for a vehicle wheel, comprising brake release means operable to effect quick release of the brakes, a casing structure having a liquid supply reservoir and a pressure chamber, pump means mounted in said casing structure and operative by said wheel to supply liquid from said reservoir to said chamber according to the rotative speed of the wheel, a spring, a movable abutment biased by said spring toward a normal position and movable therefrom by the pressure of liquid supplied to said chamber for varying the flow area of a return passage leading therefrom to said reservoir, a piston secured to said movable abutment and movable thereby through a bore formed within said casing structure, said piston having a restricted port providing communication from said bore to said chamber, and means responsive to the force of said spring transmitted by means of liquid in said bore for causing operation of said brake release means.

9. Deceleration control apparatus for governing the operation of the brakes for a vehicle wheel, comprising electroresponsive brake release means operable to effect release of the brakes, switch means operative to close a circuit for energizing said electroresponsive means, a casing structure having a liquid supply reservoir and a pressure chamber, pumping means mounted in said casing structure and operative by said vehicle wheel to supply liquid from said reservoir to said chamber according to the rotative speed of the wheel, a movable abutment biased toward a normal position and movable therefrom under the pressure of liquid in said chamber for varying the flow area of a return passage leading from said chamber to said reservoir, a piston mounted in a bore in said casing structure and operative upon movement of said movable abutment from its normal position to effect flow of liquid from said chamber to said bore by way of a restricted port, and means responsive to a force transmitted through the medium of liquid in said bore, due to sudden movement of said movable abutment and piston toward the normal position, for actuating said switch means.

BURTON S. AIKMAN.